United States Patent
Agrawal et al.

(10) Patent No.: US 10,419,968 B2
(45) Date of Patent: Sep. 17, 2019

(54) DYNAMIC SELECTION OF TCP CONGESTION CONTROL FOR IMPROVED PERFORMANCES

(71) Applicant: International Business Machines Corporation, Armonk, NY (US)

(72) Inventors: Dakshi Agrawal, Monsey, NY (US); Erich M Nahum, New York, NY (US); Vasileios Pappas, Elmsford, NY (US); Franck Le Thai, White Plains, NY (US); Maroun Touma, Redding, CT (US); Dinesh C Verma, New Castle, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 523 days.

(21) Appl. No.: 15/085,074

(22) Filed: Mar. 30, 2016

(65) Prior Publication Data
US 2017/0289838 A1 Oct. 5, 2017

(51) Int. Cl.
*H04W 28/02* (2009.01)
*H04L 29/08* (2006.01)
*H04W 88/18* (2009.01)

(52) U.S. Cl.
CPC ......... *H04W 28/0273* (2013.01); *H04L 67/28* (2013.01); *H04L 67/2823* (2013.01); *H04W 28/0289* (2013.01); *H04W 88/182* (2013.01)

(58) Field of Classification Search
CPC ......... H04W 28/0273; H04W 28/0289; H04W 88/182; H04L 67/28; H04L 67/2823
See application file for complete search history.

(56) References Cited

U.S. PATENT DOCUMENTS

| | | | |
|---|---|---|---|
| 6,757,248 B1* | 6/2004 | Li | H04L 1/1858 370/235 |
| 7,843,828 B2 | 11/2010 | Key et al. | |
| 7,961,617 B2 | 6/2011 | Hosein | |
| 8,325,602 B2 | 12/2012 | Rivers et al. | |
| 8,539,513 B1* | 9/2013 | Starr | G06F 9/45533 709/227 |
| 8,630,204 B1* | 1/2014 | Williams | H04L 69/168 370/253 |

(Continued)

OTHER PUBLICATIONS

Stew, C.K., Feng, G., Long, F., & Er, M. H. (2005). Congestion control based on flow-state-dependent dynamic priority scheduling. IEE Proceedings-Communications, 152(5), 548-558.

(Continued)

*Primary Examiner* — Blake J Rubin
(74) *Attorney, Agent, or Firm* — Cantor Colburn LLP; Daniel Morris

(57) ABSTRACT

A method includes positioning a proxy between a client and a server; the proxy receiving the client's Transmission Control Protocol (TCP) communications intended for establishing a communication connection to the server; the proxy initiating a TCP communication with the server after receiving the client's TCP; and the proxy determining a TCP congestion control algorithm based upon identifying information of the received client's TCP and on properties of the sever to provide optimum communications as a communication proxy between the client and the server.

15 Claims, 4 Drawing Sheets

(56) References Cited

U.S. PATENT DOCUMENTS

| | | | |
|---|---|---|---|
| 8,949,444 B1* | 2/2015 | Ma | H04L 47/10 709/228 |
| 8,966,112 B1* | 2/2015 | Franke | H04L 69/321 370/229 |
| 9,143,450 B2* | 9/2015 | Chen | H04L 47/10 |
| 9,397,939 B2* | 7/2016 | Kashyap | H04L 45/74 |
| 10,043,137 B1* | 8/2018 | Jorgensen | G06F 16/951 |
| 10,135,956 B2* | 11/2018 | Choi | H04L 69/161 |
| 10,263,894 B2* | 4/2019 | Lopez Serrano | H04L 47/122 |
| 2006/0182025 A1* | 8/2006 | Kim | H04L 1/1825 370/229 |
| 2006/0193295 A1* | 8/2006 | White | H04L 12/5692 370/336 |
| 2007/0248013 A1 | 10/2007 | Sridharan et al. | |
| 2008/0239948 A1 | 10/2008 | Bai et al. | |
| 2008/0320151 A1* | 12/2008 | McCanne | H03M 7/30 709/228 |
| 2009/0037353 A1* | 2/2009 | Greenwald | G06N 20/00 706/20 |
| 2011/0249553 A1* | 10/2011 | Wang | H04L 47/225 370/230 |
| 2012/0054330 A1* | 3/2012 | Loach | H04L 47/17 709/224 |
| 2012/0124135 A1* | 5/2012 | Nagpal | H04L 65/1063 709/204 |
| 2012/0163167 A1* | 6/2012 | Dade | H04L 47/40 370/229 |
| 2013/0114408 A1* | 5/2013 | Sastry | H04W 28/02 370/231 |
| 2013/0163428 A1* | 6/2013 | Lee | H04L 47/28 370/235 |
| 2013/0223254 A1* | 8/2013 | Oguchi | H04L 47/283 370/252 |
| 2014/0105035 A1* | 4/2014 | Lam | H04W 28/22 370/252 |
| 2014/0133306 A1* | 5/2014 | Park | H04W 28/0273 370/235 |
| 2014/0185452 A1* | 7/2014 | Kakadia | H04W 28/12 370/236 |
| 2014/0259147 A1* | 9/2014 | L'Heureux | H04L 63/02 726/14 |
| 2014/0286239 A1* | 9/2014 | Chowdhury | H04L 1/1812 370/328 |
| 2015/0020188 A1* | 1/2015 | Segal | H04L 63/0227 726/13 |
| 2015/0043332 A1* | 2/2015 | Nylander | H04L 29/06095 370/229 |
| 2015/0103658 A1* | 4/2015 | Okuno | H04W 28/0289 370/232 |
| 2015/0117208 A1* | 4/2015 | Radulescu | H04L 43/10 370/235 |
| 2015/0288611 A1* | 10/2015 | Fan | H04W 76/00 370/280 |
| 2015/0334021 A1* | 11/2015 | Vadura | H04L 69/16 370/230 |
| 2016/0094466 A1* | 3/2016 | Arvidsson | H04W 80/06 370/235 |
| 2016/0094470 A1* | 3/2016 | Skog | H04W 28/0205 370/230 |
| 2016/0149817 A1* | 5/2016 | Tanida | H04L 47/193 370/236 |
| 2016/0359681 A1* | 12/2016 | McGleenon | H04L 43/0876 |
| 2017/0195231 A1* | 7/2017 | Lopez Serrano | H04L 47/11 |
| 2018/0027079 A1* | 1/2018 | Ben Ali | G06F 9/45558 709/216 |

OTHER PUBLICATIONS

Bauer, S., Beverly, R., & Berger, A. (Nov. 2011). Measuring the state of ecn readiness in servers, clients, and routers. In Proceedings of the 2011 ACM SIGCOMM conference on Internet measurement conference (pp. 171-180). ACM.

Ivanovich, M., et al. "On TCP performance enhancing proxies in a wireless environment." Communications Magazine, IEEE 46.9 (2008): 76-83.

Tian, Y. et al., "TCP in wireless environments: problems and solutions." Communications Magazine, IEEE 43.3 (2005): S27-S32.

"Analyzing UDP usage in Internet traffic" http://www.caida.org/research/traffic-analysis/tcpudpratio/ Sep. 26, 2013.

La et al., "Issues in TCP Vegas", http://www.eecs.berkeley.edu/~ananth/1999-2001/Richard/IssuesInTCPVegas.pdf, 1999.

Allman et al., "TCP Congestion Control", http://tools.ietf.org/html/rfc5681, Sep. 2009.

Brakmo et al., "TCP Vegas: new techniques for congestion detection and avoidance", http://dl.acm.org/citation.cfm?id=190317, 1994.

Ramakrisnan et al., "The Addition of Explicit Congestion Notification (ECN) to IP", http://tools.ietf.org/html/rfc3168, Sep. 2001.

DARPA, "Tramsission Control Protocol", http://tools.ietf.org/html/rfc793, Sep. 1981.

\* cited by examiner

US 10,419,968 B2

DYNAMIC SELECTION OF TCP CONGESTION CONTROL FOR IMPROVED PERFORMANCES

BACKGROUND

The present invention relates to dynamic selection of Transmission Control Protocol (TCP), and more specifically, to using unique information of a client device to determine a TCP control protocol.

More than 90% of the Internet traffic is carried over the Transmission Control Protocol (TCP). However, TCP performs poorly in wireless environments. The reason is TCP was originally designed for wired networks, and interprets packet losses as a sign of congestion. As such, TCP halves the sending throughput upon detecting packet losses. However, in wireless environments, packet losses may be caused not only by congestion but also because of wireless interference (e.g., hidden terminal, Bluetooth devices, cordless phones, wireless speakers or microwave oven near the user device). Since TCP does not distinguish the cause of the packet losses (congestion versus interference), its multiplicative decrease congestion control behavior can result in poor performances in heterogeneous environments with wired and wireless lossy links.

The networking community has developed several solutions. Some of these solutions require support by both endpoints and by routers in the path. Other solutions include different versions of TCP congestion control. However, these solutions require modifications at the sender end to support the new congestion control algorithms.

SUMMARY

According to one aspect of the present invention, a method includes positioning a proxy between a client and a server; the proxy receiving the client's Transmission Control Protocol (TCP) communications intended for establishing a communication connection to the server; the proxy initiating a TCP communication with the server after receiving the client's TCP; and the proxy determining a TCP congestion control algorithm based upon identifying information of the received client's TCP and on properties of the sever to provide optimum communications as a communication proxy between the client and the server.

According to another aspect of the present invention, a system includes one or more processors, one or more computer-readable memories and one or more computer-readable, tangible storage devices; a proxy module operatively coupled to at least one of the one or more storage devices for execution by at least one of the one or more processors via at least one of the one or more memories, configured to be positioned between a client and a server; the proxy module operatively coupled to at least one of the one or more storage devices for execution by at least one of the one or more processors via at least one of the one or more memories, configured to receive the client's Transmission Control Protocol (TCP) communications intended for establishing a communication connection to the server; the proxy module operatively coupled to at least one of the one or more storage devices for execution by at least one of the one or more processors via at least one of the one or more memories, configured to initiate a TCP communication with the server after receiving the client's TCP; and the proxy module operatively coupled to at least one of the one or more storage devices for execution by at least one of the one or more processors via at least one of the one or more memories, configured to determine a TCP congestion control algorithm based upon identifying information of the received client's TCP and on properties of the sever to provide optimum communications as a communication proxy between the client and the server.

According to yet another aspect of the present invention, a computer program product including one or more computer-readable storage medium, wherein the computer readable storage medium is not a transitory signal per se; program instructions, stored on at least one of the one or more storage medium, to cause a proxy being positioned between a client and a server to receive the client's Transmission Control Protocol (TCP) communications intended for establishing a communication connection to the server; program instructions, stored on at least one of the one or more storage medium, to cause the proxy to initiate a TCP communication with the server after receiving the client's TCP; and program instructions, stored on at least one of the one or more storage medium, to cause the proxy to determine a TCP congestion control algorithm based upon identifying information of the received client's TCP and on properties of the sever to provide optimum communications as a communication proxy between the client and the server.

BRIEF DESCRIPTION OF THE OF THE DRAWINGS

DETAILED DESCRIPTION

Figure 1:
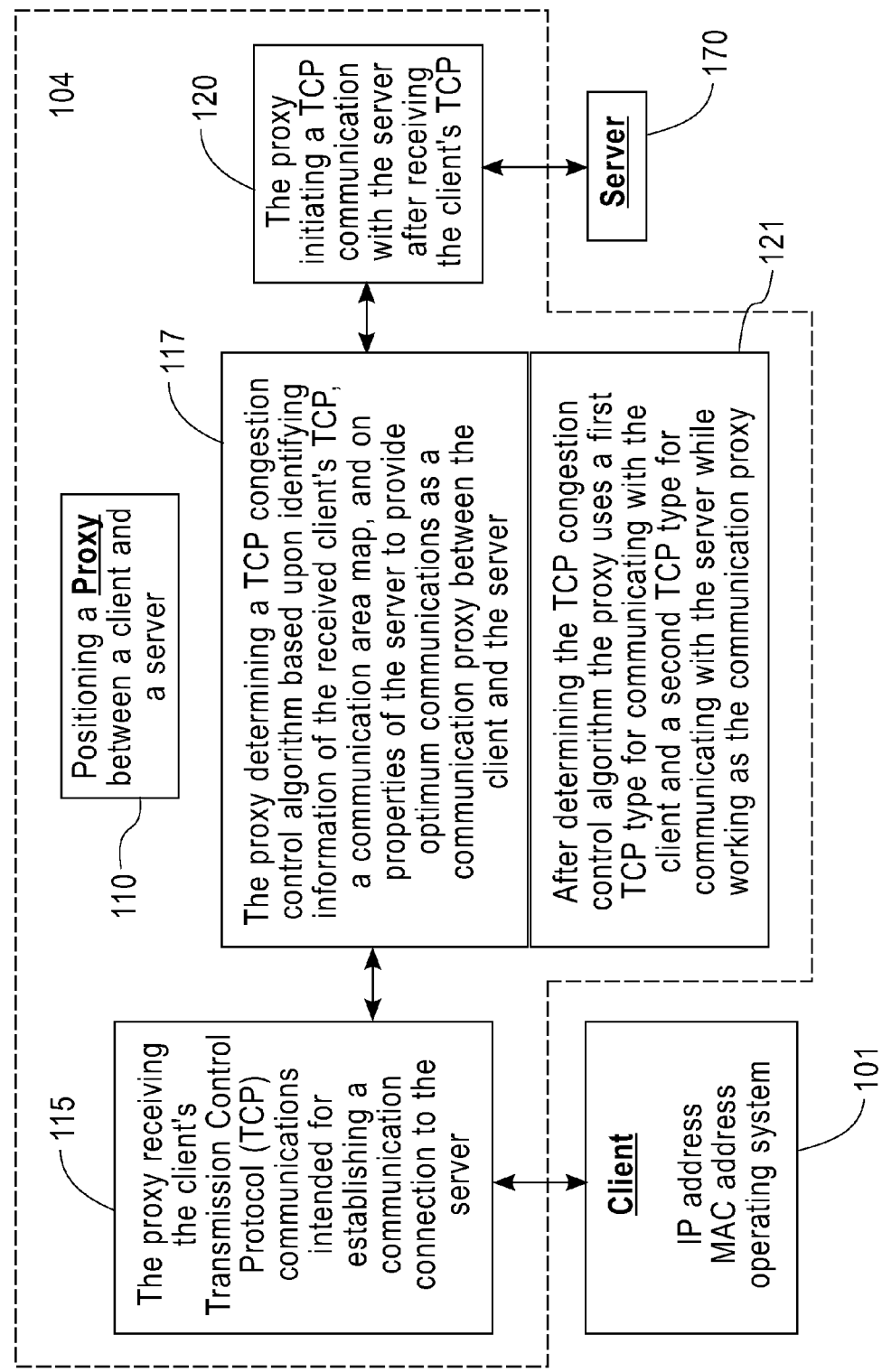
FIG. 1 shows a flowchart according to an embodiment of the present invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. As will be appreciated by one skilled in the art, aspects of the present invention may be embodied as a system, method or computer program product.

Now referring to FIG. 1, shown is a process according to an embodiment of the present invention. The process starts by placing (110) a proxy 104 between a client 101 and a server 170. When the client 101 wants to communicate with the server 170, the proxy receives the client's Transmission Control Protocol (TCP) communications intended for establishing a communication connection to the server (115). The proxy initiates a TCP communication with the server after receiving the client's TCP (120). The process continues by having the proxy determine a TCP congestion control algorithm based upon identifying information of the received client's TCP, a communication area map, and on properties of the server to provide optimum communications as a communication proxy between the client and the server (117). After determining the TCP congestion control algorithm the proxy uses a first TCP type for communicating with the client and a second TCP type for communicating with the server while working as the communication proxy (121). Examples of the TCP types which can be used will be described hereafter.

Figure 2:
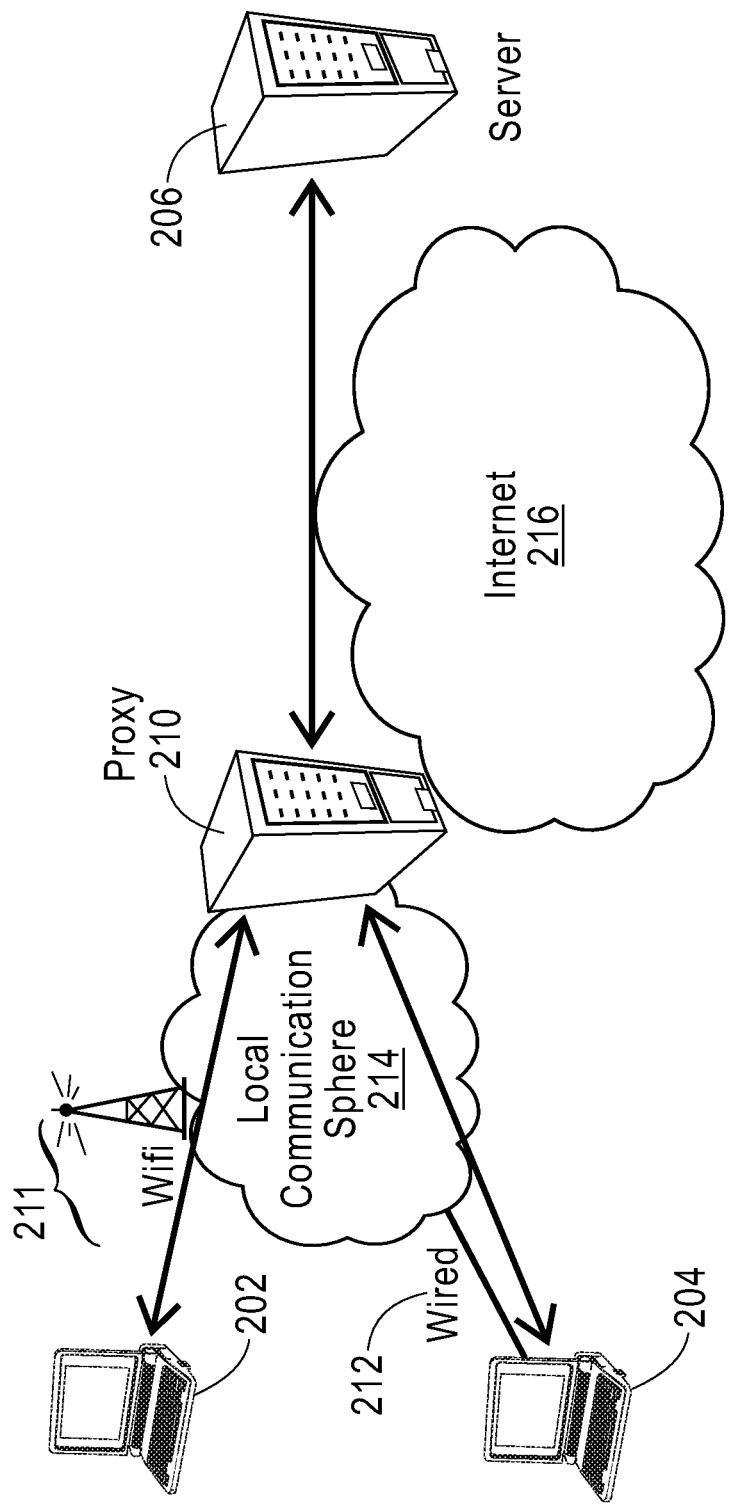
FIG. 2 shows exemplary implementation according to an embodiment of the present invention.

Referring to FIG. 2, an exemplary implementation according to an embodiment of the present invention is depicted. Client devices (202, 204) communicates with a sever 206 via a proxy 210. The client devices (202, 204) may be either wireless 211 enabled devices or connected wired 212 devices. The client devices (202, 204) communicate with the proxy 210 which may be part a local communication sphere 214. In the case of wireless devices 202, the local communication sphere 214 may be the network of a cellular provider, or a Wi-Fi enabled intranet as part of a business or home. In the case of wired connected devices 204, the local communication sphere 214 may be the network of a cable or telecom provider, or the intranet as part of a business or home. As described with the above process, the proxy 210 receives the TCP of the client devices 202 and determines a best TCP for communicating with the server 206 via the internet 216. The proxy 210 then acts a communication proxy for the client devices (202, 204) and the server 206.

An embodiment of the present invention consists of dynamically selecting the version of the TCP congestion control algorithm (e.g., Reno, Vegas, Westwood, etc.) to improve the performances of that connection. For example, the IP address can indicate that the client is wireless. As such, TCP Westwood would provide better performances than TCP Reno. The TCP version to be adopted can also be determined by the MAC address of the client, the operating system of the client, or the application (e.g., TCP port number). As additional alternative, the IP address may be mapped to a map that provides characteristics of the area (e.g., packet loss, delay, etc.) and that can be used to determine the TCP version to adopt.

Different versions of TCP are selected and adopted over the different segments based on the characteristics of the client and server: From the IP address, a proxy may determine that a client is wireless, and therefore splits the TCP connections, adopts TCP Westwood over the wireless links, and TCP Reno over the wired links. For example, for a wireless network comprising of a wireless link between the client and an access point, followed by a wired link between the access point and the server, the following may be used:

Client<---[wireless]--->Access Point<---[wired]---> Server
Client<---TCP Westwood--->Proxy<---TCP Reno---> Server Advantages of a preferred embodiment of the present invention allows for different TCP versions to be deployed depending on the properties of the client. In addition, modifications at the end points is not required and offers higher performances.

Figure 3:
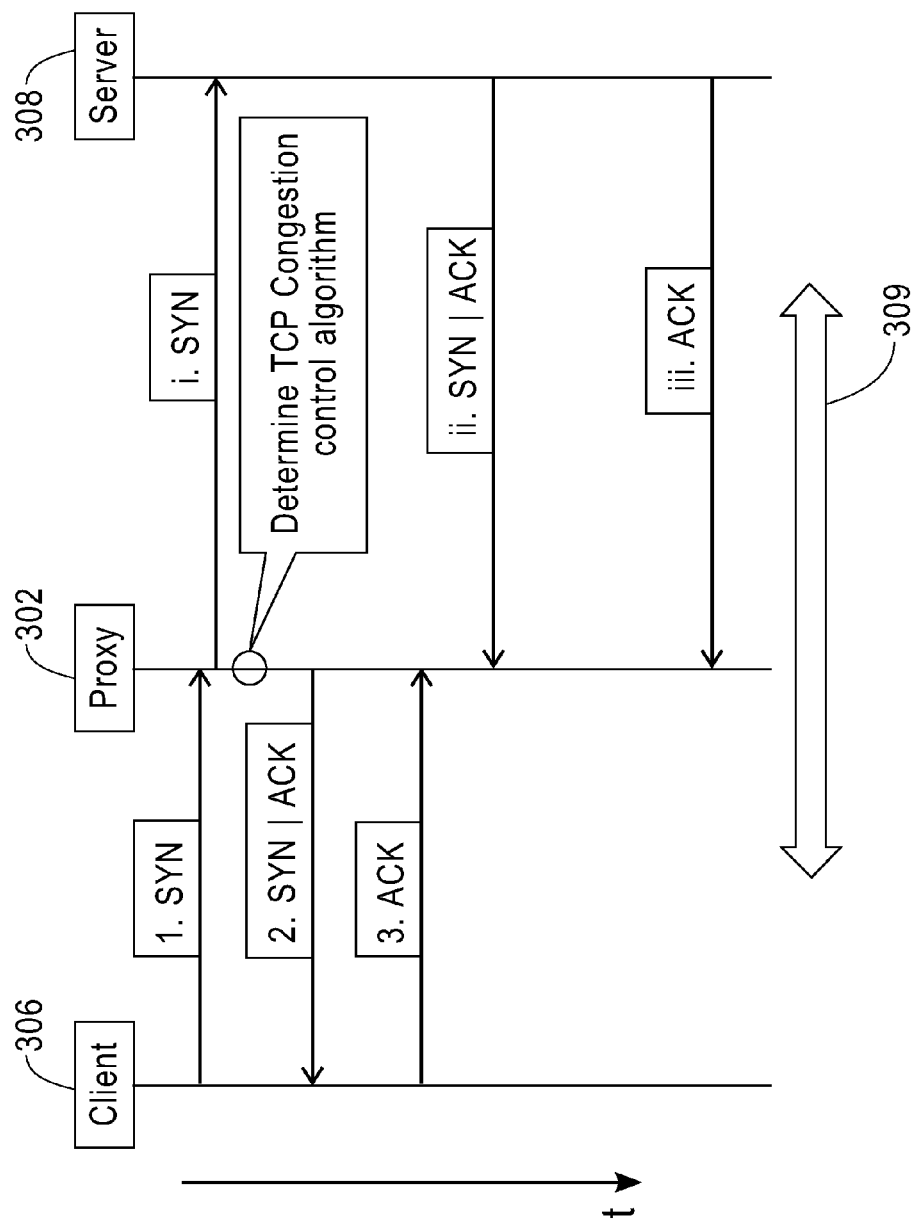
FIG. 3 shows another exemplary implementation according to an embodiment of the present invention.

Referring to FIG. 3, an exemplary implementation according to an embodiment of the present invention is depicted. When a proxy 302 is used as part of the communication path between a client 306 and a server 308 the following occurs over time t. When a client 306 sends a TCP SYN to a server 308, the proxy 302 intercepts the TCP SYN and completes the three way handshake with the client 306. The proxy 302 adopts a version of TCP based on properties from the client (e.g., IP address, MAC address, Operating System, Application, etc.). The proxy 302 then initiates a new TCP connection with the server 308. The proxy 302 sends the server 308 a TCP SYN on behalf of the client 306. This is achieved transparently by preserving the source IP address and source port number to be those of the client 306. The proxy 302 adopts a different version of TCP based on the properties of the server 308. Upon completion of the two TCP connections, the proxy 302 forwards the segments received from the server 308 to the client 306 and vice versa.

Figure 4:
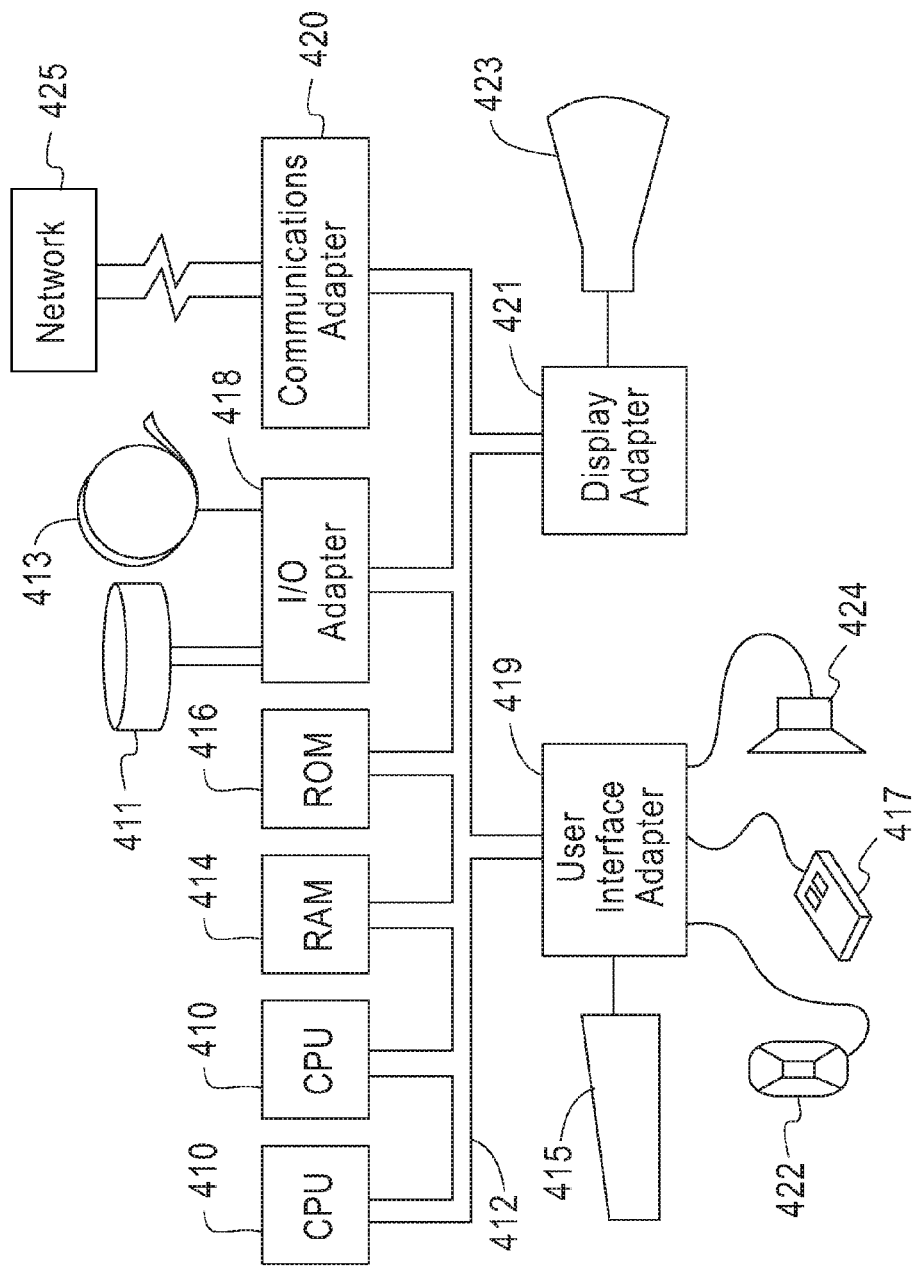
FIG. 4 illustrates a hardware configuration according to an embodiment of the present invention.

Referring now to FIG. 4, this schematic drawing illustrates a hardware configuration of an information handling/computer imaging system in accordance with the embodiments of the invention. The system comprises at least one processor or central processing unit (CPU) 410. The CPUs 410 are interconnected via system bus 412 to various devices such as a random access memory (RAM) 414, read-only memory (ROM) 416, and an input/output (I/O) adapter 418. The I/O adapter 418 can connect to peripheral devices, such as disk units 411 and tape drives 413, or other program storage devices that are readable by the system. The system can read the inventive instructions on the program storage devices and follow these instructions to execute the methodology of the embodiments of the invention. The system further includes a user interface adapter 419 that connects a keyboard 415, mouse 417, speaker 424, microphone 422, and/or other user interface devices such as a touch screen device (not shown) to the bus 412 to gather user input. Additionally, a communication adapter 420 connects the bus 412 to a data processing network 425, and a display adapter 421 connects the bus 412 to a display device 423 which may be embodied as an output device such as a monitor, printer, or transmitter, for example.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   positioning a proxy between a client and a server;
   the proxy receiving the client's Transmission Control Protocol (TCP) communications intended for establishing a communication connection to the server;
   the proxy initiating a TCP communication with the server after receiving the client's TCP; and
   the proxy determining a TCP congestion control algorithm based upon identifying information of the received client's TCP and on properties of the sever to provide optimum communications as a communication proxy between the client and the server, wherein after determining the TCP congestion control algorithm the proxy uses a first TCP type for communicating with the client and a second TCP type for communicating with the server while working as the communication proxy and wherein the identifying information of the received client's TCP is based upon the operating system of the client.

2. The method according to claim 1, wherein the identifying information of the received client's TCP further includes an IP address of the client.

3. The method according to claim 1, wherein the identifying information of the received client's TCP further includes a MAC address of the client.

4. The method according to claim 1, wherein the proxy is positioned within a local communication sphere of the client.

5. The method according to claim 1, further comprising the proxy determining the TCP congestion control algorithm based upon a communication area map.

6. A system comprising:
one or more processors, one or more computer-readable memories and one or more computer-readable, tangible storage devices;
a proxy module operatively coupled to at least one of the one or more storage devices for execution by at least one of the one or more processors via at least one of the one or more memories, configured to be positioned between a client and a server;
the proxy module operatively coupled to at least one of the one or more storage devices for execution by at least one of the one or more processors via at least one of the one or more memories, configured to receive the client's Transmission Control Protocol (TCP) communications intended for establishing a communication connection to the server;
the proxy module operatively coupled to at least one of the one or more storage devices for execution by at least one of the one or more processors via at least one of the one or more memories, configured to initiate a TCP communication with the server after receiving the client's TCP; and
the proxy module operatively coupled to at least one of the one or more storage devices for execution by at least one of the one or more processors via at least one of the one or more memories, configured to determine a TCP congestion control algorithm based upon identifying information of the received client's TCP and on properties of the sever to provide optimum communications as a communication proxy between the client and the server, wherein after determining the TCP congestion control algorithm the proxy module uses a first TCP type for communicating with the client and a second TCP type for communicating with the server while working as the communication proxy and wherein the identifying information of the received client's TCP is based upon the operating system of the client.

7. The system according to claim 6, wherein the identifying information of the received client's TCP further includes an IP address of the client.

8. The system according to claim 6, wherein the identifying information of the received client's TCP further includes a MAC address of the client.

9. The system according to claim 6, wherein the proxy module is positioned within a local communication sphere of the client.

10. The system according to claim 6, further comprising the proxy module operatively coupled to at least one of the one or more storage devices for execution by at least one of the one or more processors via at least one of the one or more memories, configured to determine the TCP congestion control algorithm based upon a communication area map.

11. A computer program product comprising:
one or more computer-readable storage medium, wherein the computer readable storage medium is not a transitory signal per se;
program instructions, stored on at least one of the one or more storage medium, to cause a proxy being positioned between a client and a server to receive the client's Transmission Control Protocol (TCP) communications intended for establishing a communication connection to the server;
program instructions, stored on at least one of the one or more storage medium, to cause the proxy to initiate a TCP communication with the server after receiving the client's TCP; and
program instructions, stored on at least one of the one or more storage medium, to cause the proxy to determine a TCP congestion control algorithm based upon identifying information of the received client's TCP and on properties of the sever to provide optimum communications as a communication proxy between the client and the server, wherein after determining the TCP congestion control algorithm the proxy module uses a first TCP type for communicating with the client and a second TCP type for communicating with the server while working as the communication proxy and wherein the identifying information of the received client's TCP is based upon the operating system of the client.

12. The computer program product according to claim 11, wherein the identifying information of the received client's TCP further includes an IP address of the client.

13. The computer program product according to claim 11, wherein the identifying information of the received client's TCP further includes a MAC address of the client.

14. The computer program product according to claim 11, wherein the proxy is positioned within a local communication sphere of the client.

15. The computer program product according to claim 11, further comprising program instructions, stored on at least one of the one or more storage medium, to cause the proxy to determine the TCP congestion control algorithm based upon a communication area map.

* * * * *